United States Patent [19]

Wallerstorfer et al.

[11] Patent Number: 5,473,145
[45] Date of Patent: Dec. 5, 1995

[54] DATA CARRIER

[75] Inventors: Kurt Wallerstorfer, Irrsdorf; Christian Windhager, Elsbethen; Wolfram Kocznar, Innsbruck, all of Austria

[73] Assignee: Skidata Computer Gesellschaft m.b.H., Gartenau, Austria

[21] Appl. No.: 256,021

[22] PCT Filed: Oct. 21, 1993

[86] PCT No.: PCT/AT93/00160

§ 371 Date: Jun. 21, 1994

§ 102(e) Date: Jun. 21, 1994

[87] PCT Pub. No.: WO94/09450

PCT Pub. Date: Apr. 28, 1994

[30] Foreign Application Priority Data

Oct. 22, 1992 [AT] Austria ............... 2088/92
Dec. 31, 1992 [AT] Austria ............... 2605/92

[51] Int. Cl.⁶ .................. G06K 5/00; G06K 19/07
[52] U.S. Cl. ................ 235/382; 235/492; 235/380; 235/382.5
[58] Field of Search ................ 235/492, 380, 235/381, 382, 382.5, 449, 487; 345/87, 905

[56] References Cited

U.S. PATENT DOCUMENTS

| 4,650,981 | 3/1987 | Foletta | 235/449 |
| 4,701,601 | 10/1987 | Francini et al. | 235/449 |
| 4,769,765 | 9/1988 | Green | 364/145 |
| 4,800,255 | 1/1989 | Imran | 235/492 |
| 4,812,634 | 3/1989 | Ohta et al. | 235/492 |
| 4,829,166 | 5/1989 | Froelich | 235/492 |
| 4,864,115 | 9/1989 | Imran et al. | 235/492 |
| 5,138,142 | 8/1992 | Sanemitsu | 235/492 |

FOREIGN PATENT DOCUMENTS

| 0198642 | 10/1986 | European Pat. Off. . |
| 0316157 | 5/1989 | European Pat. Off. . |
| 0328062 | 8/1989 | European Pat. Off. . |
| 0168836 | 11/1990 | European Pat. Off. . |
| 0400764 | 12/1990 | European Pat. Off. . |
| 0147099 | 6/1992 | European Pat. Off. . |
| 3222288 | 12/1983 | Germany . |
| 3935364 | 8/1990 | Germany . |
| 2020869 | 11/1979 | United Kingdom . |
| 2151987 | 7/1985 | United Kingdom . |
| WO8803296 | 5/1988 | WIPO . |
| WO8809541 | 12/1988 | WIPO . |

*Primary Examiner*—David C. Nelms
*Assistant Examiner*—Tan Nguyen
*Attorney, Agent, or Firm*—Lorusso & Loud

[57] ABSTRACT

The invention is a data carrier comprising a carrier base structure, a non-volatile, electrically erasable and programmable memory designed to store the data, a data sending-receiving unit for receiving data from a control unit and transmitting data to a coding and/or reading station, a liquid crystal display, means for making visible on the liquid crystal display the data contained in the memory, and a power supply means having a power source arranged in the data carrier.

6 Claims, 6 Drawing Sheets

DATA CARRIER

FIELD OF THE INVENTION

1. Background of the Invention

The invention relates to a data carrier for use in entry, identification and/or contol systems, comprising a data sending-receiving unit communicating with at least one coding and/or reading station, a non-volatile, electrically erasable and programmable memory, a sending-receiving logic writing the data into the memory and reading the same from the memory, a liquid crystal display, means for making visible on the liquid crystal display the data contained in the memory, and power supply means having a power source arranged in the data carrier.

2. Description of the Related Art

A data carrier of the afore-mentioned kind operated by an incorporated power source is known from EP-A 327 541. Sending data, when communicating with the coding and/or reading station, as well as switching the liquid crystal display consumes a relatively high amount of energy. Energy supply by means of a non-chargeable, exchangeable battery involves known problems in respect of the disposal of used batteries, possible leakage of the housing to be closed, etc. If a chargeable battery or a solar cell is used, problems in respect of dimensioning etc. result. The use of solar cells further creates the problem that the data carrier may not be usable at dawn or at night. A number of possibilities for non-contact transmission of the required energy from the control or reading device are also known, for example by inductive transmission according to EP-A 400 764 or 198 642, by light irradiating a photocell according to EP-A 168 836, etc. In these embodiments, sufficient amounts of energy are available, but they involve the problem that the indication of the memory content requires the presence of the control or reading device. Information regarding the stored data is therefore not available at any time.

SUMMARY OF THE INVENTION

It is now the object of the invention to provide a data carrier of the type mentioned in the introduction to this specification in which the mentioned problems are eliminated or at least reduced. The data carrier shall have available in each case the required amount of energy for the occasional data transmission as well as for any independent indication of data.

According to the invention, this is achieved in that the power supply means comprise two parts electrically independent from each other, the first part being the power source arranged in the data carrier, that the liquid crystal display and the means for making visible the memory content are connected with the first part of the power supply means, and that the second part of the power supply means is formed by a non-contact transmission element, associated with the sending-receiving logic and the memory, of a second power source provided in the coding and/or reading station. The separation of the power supply into two power sources which are independent from each other makes it possible to adapt the power supply of the individual component parts far better to the requirements. The energy required for data transmission can thus be transmitted from the coding and/or reading station in contact-free manner, while the power source provided in the data carrier has to supply at any time only the relatively low amount of energy needed for the liquid crystal display and can hence be smaller dimensioned. This facilitates essentially the constructional design of the data carrier, a failure in the power source contained in the data carrier being of no importance for the control function. The transmission of the operating current for the memory and the sending-receiving logic is preferably inductive by means of a coil, and the power source contained in the data carrier is provided preferably in the form of a solar cell. The data stored in the data carrier are hence displayable at any time. To make operating buttons unnecessary, the liquid crystal display may, however, also be provided with automatic change-over means so that different data can be read in repeated sequence, for example the value of the data carrier, the end of the period of validity, details and information regarding initialization and the entitled owner, etc. Hence, the data carrier is usable without any limitation with regard to time, is a self-sufficient system if a solar cell is used, is reusable through reprogramming and is also suitable for use of the type in which the value indicating the memory content changes.

The means for making visible the memory content may for example comprise an interpreter, preferably provided is, however, a microprocessor which brings the data contained in the memory in a visually understandable form. An $E^2PROM$ in particular serves as a memory. The non-contact data transmission is effected in a low frequency magnetic field (e.g. about 120 kHz) by means of electromagnetic coupling. Hence, the data carrier operates fully passively by attenuation of the reading field of the coding and/or reading station, the power supply of the sending-receiving logic from the reading field also being effected via the sending-receiving unit.

In a first constructional embodiment, the data carrier has in particular the form of a disk and is therefore similar to a coin, with the liquid crystal display and the solar cell arranged at one side of the disk, and a helically arranged antenna of the data sending-receiving unit printed on the other side of the disk. The disk is in particular of a suitable plastic material, and in a preferred embodiment circumferentially enclosed by a metallic ring which is interrupted by a slot and effects a stiffening and mechanic reinforcement of the disk. The interruption of the ring does not impede the data and energy transmission which would at least be disturbed in the case of a closed ring. A data carrier designed in the form of a disk can be used instead of a coin having a value representing a specific or diminishing amount, for example in automats. In parking garages, a data carrier of this kind can be inserted into the exit gate, when one leaves the garage, and it can be given out to someone entering the garage. The coin form of the data carrier allows the same handling as in the case of usual coins (counting, collecting, destacking, classifying, checking, etc.) so that current devices can be used.

The principle of coin-like data carriers is known from EP-A 147 099. The actual value of the data carrier is not directly visible but can be ascertained only by means of the coding and/or reading station.

For use as lift tickets or the like, for example, a further embodiment provides the disk inserted in a housing having a cord that can be pulled out by a spring spool. The free end of the cord can be attached to the clothing, and the data carrier is together with its housing approached to a reading device by pulling the cord off the spool, the cord rewinding on the spool after use. Since the length of the antenna arranged on the data carrier may not be sufficient in some cases, a further embodiment provides that a antenna extension is arranged in the housing of the disk and connected to a bare contact of the antenna.

BRIEF DESCRIPTION OF THE DRAWINGS

The invention will now be described in more detail with reference to the figures of the accompanying drawings without being limited thereto.

DESCRIPTION OF THE PREFERRED EMBODIMENTS

Figure 1:
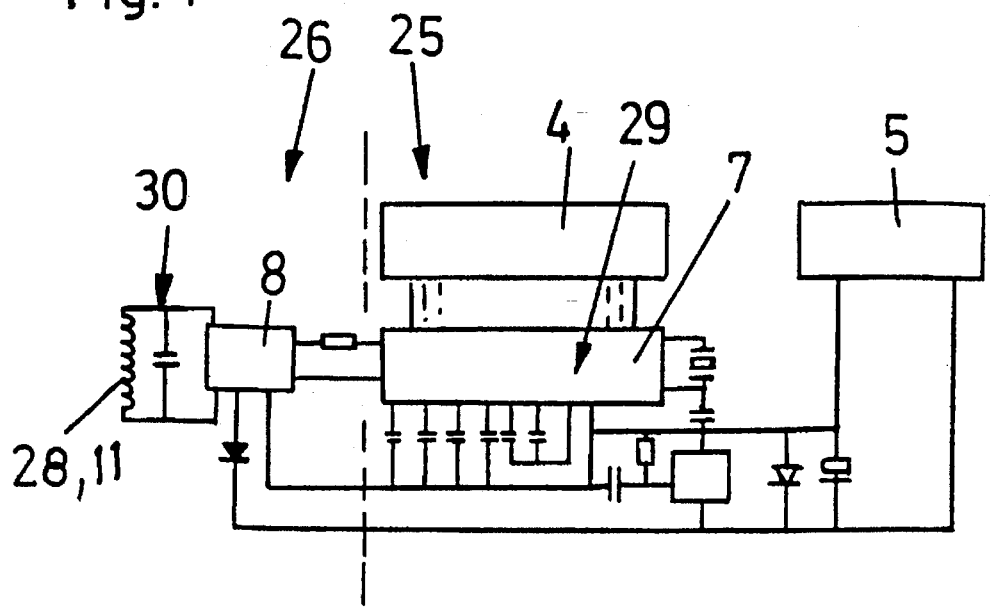
FIG. 1 shows an elementary diagram of a first embodiment of the data carrier.
Figure 2:
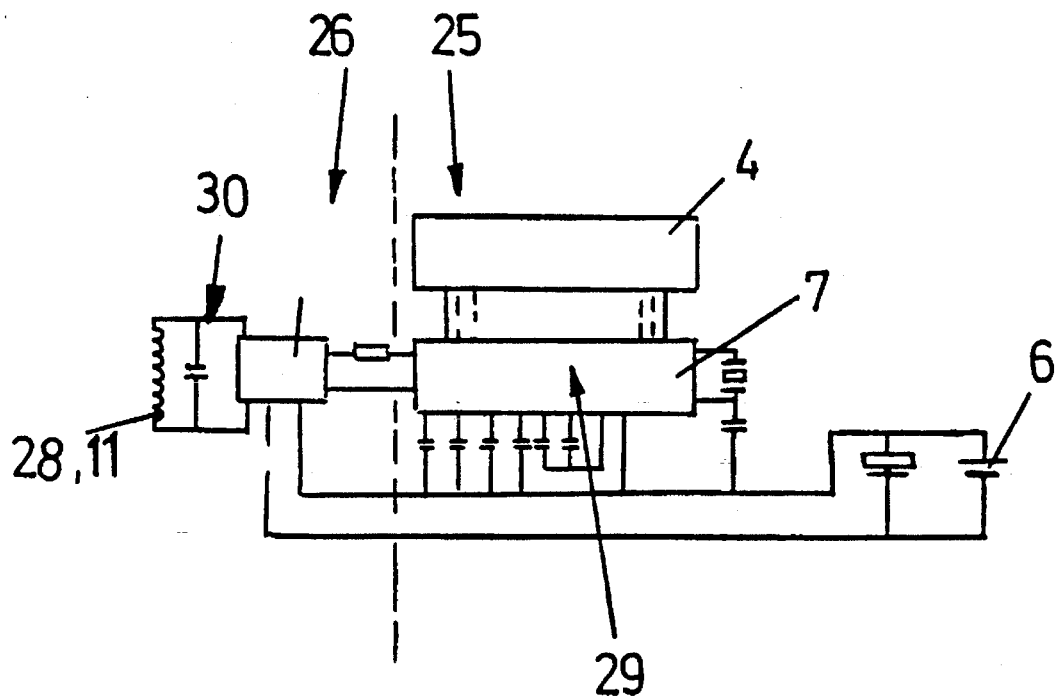
FIG. 2 shows an elementary diagram of a second embodiment of the data carrier.

As can be seen from FIGS. 1 and 2, the data carrier comprises a digital element 25 and an analogue element 26. The digital element 25 has a liquid crystal display 4, means 29 for making visible the memory content on the liquid crystal display 4 and a power source which is a solar cell 5 in FIG. 1 and a battery 6 in FIG. 2. The analogue element 26 has a read-write memory or EEPROM 8 and a sending-receiving logic comprising an antenna 11 and a coil 28, both being part of the data sending-receiving unit 30 of the data carrier. The analogue element 26 is inductively supplied with power from a power source provided in the coding and/or reading station which is not shown, the energy also being transmitted via the antenna 11 and the coil 28. Hence, checking the data carrier and processing the memory 8 is possible only by means of a reading station which supplies the required energy. This is independent of the power supply of the digital element 25. The power source 5, 6 of the latter-mentioned serves for checking the memory content and operating the means 29 provided for this purpose which may be a simple controller or which may include a complete microprocessor 7. In order to make operating buttons unnecessary it may be provided that different information blocks, such as time, date, period of validity etc. automatically alternate on the liquid crystal display 4.

Figure 3:
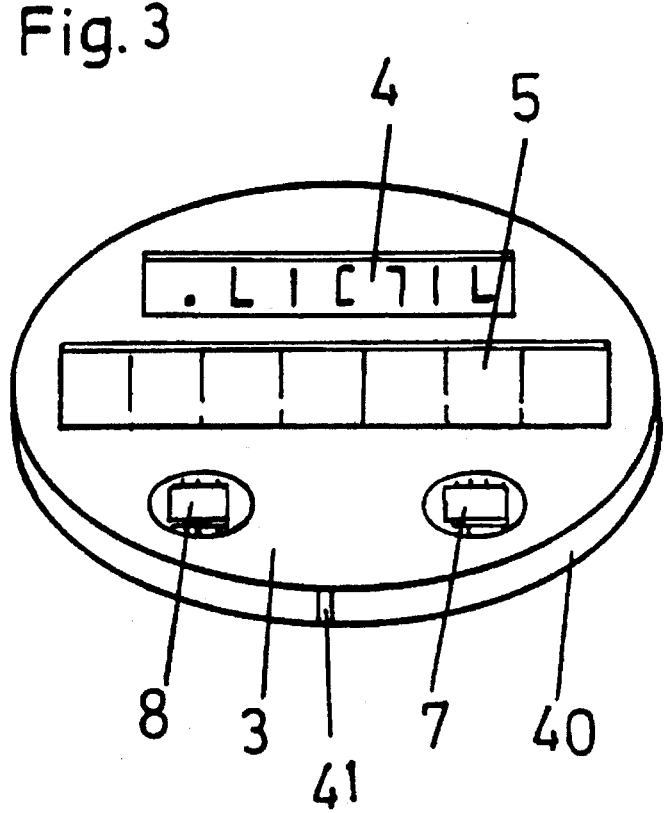
FIG. 3 shows an oblique view of a disk-shaped embodiment of the data carrier.
Figure 4:
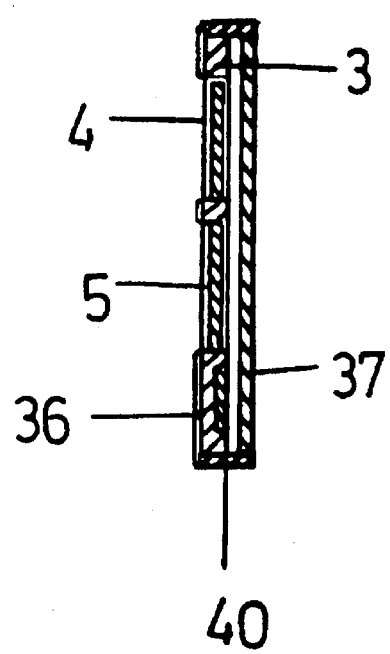
FIG. 4 shows a sectional view of the data carrier.
Figure 5:
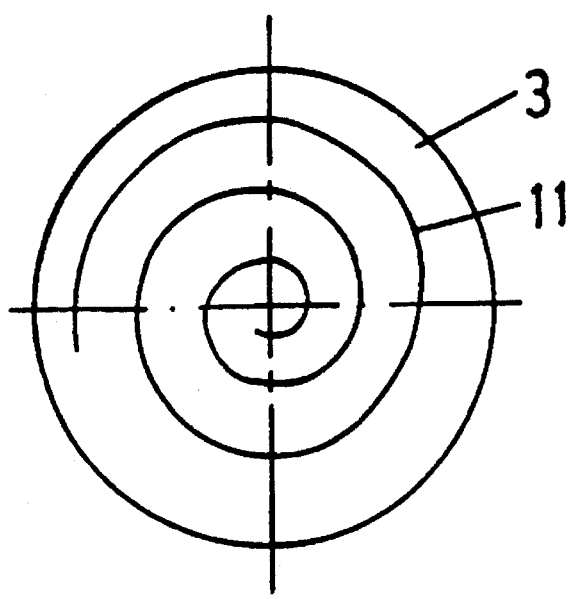
FIG. 5 shows a rear view of the data carrier.
Figure 6:
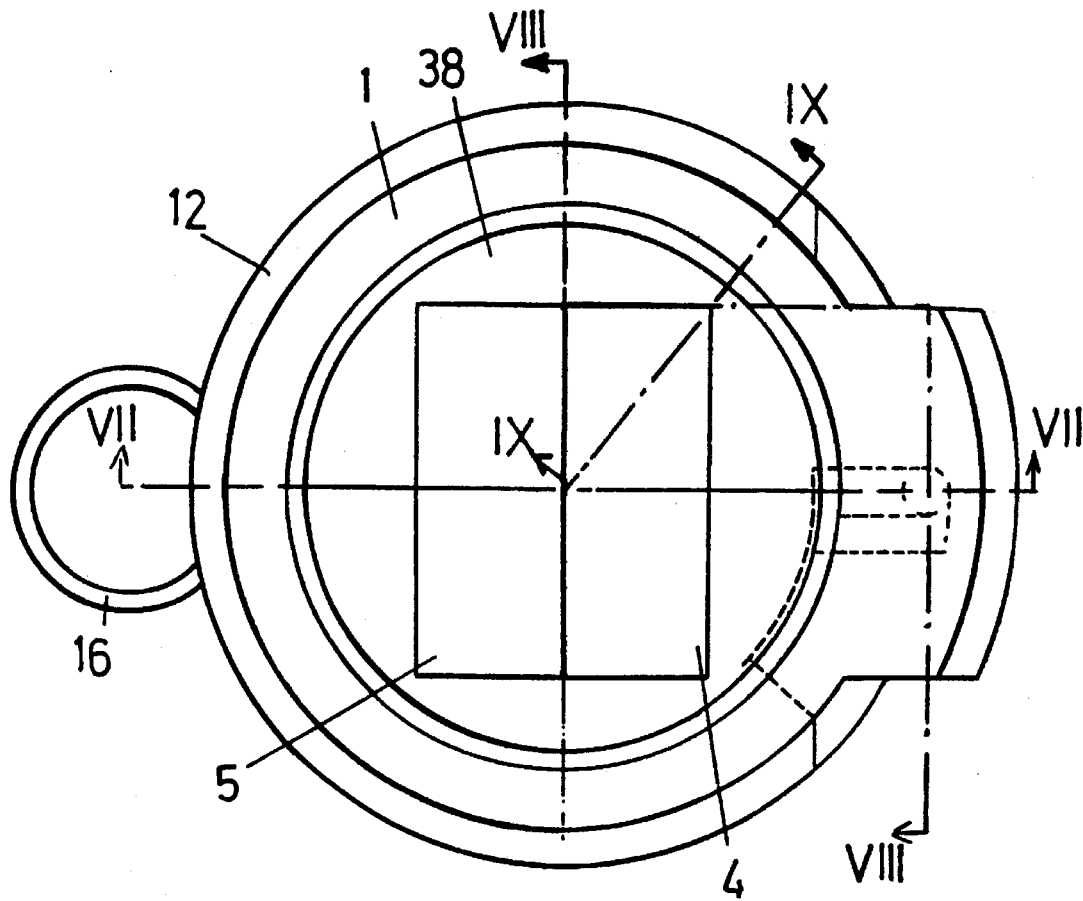
FIG. 6 shows a top view of a data carrier mounted in a housing.
Figure 7:
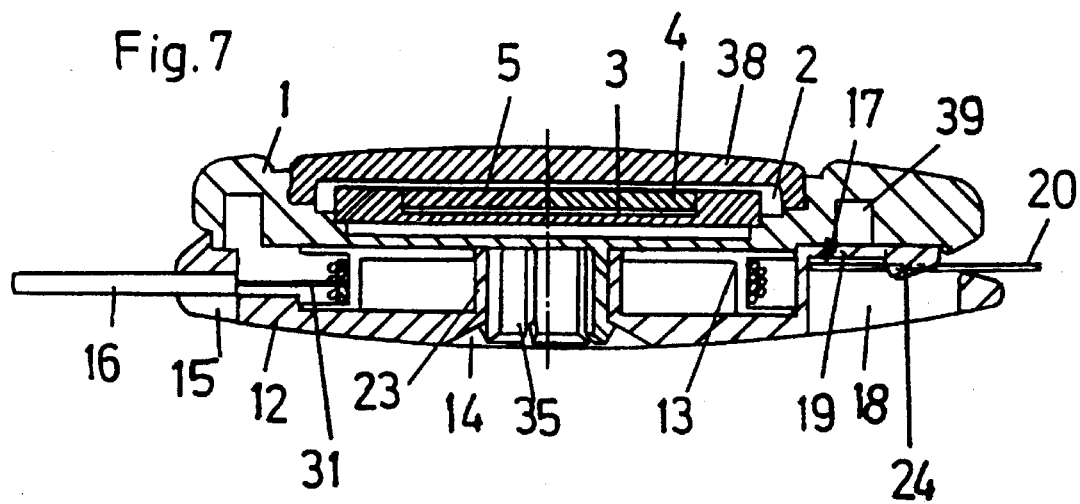
FIGS. 7 through 9 show sectional views along lines VII—VII, VIII—VIII and IX—IX of FIG. 6.
Figure 8:
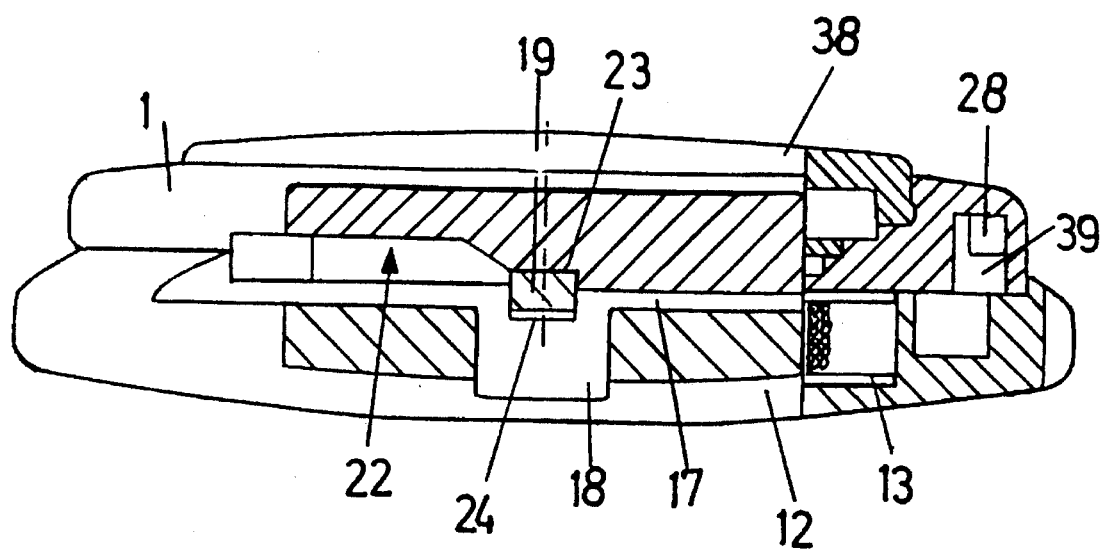
Figure 12:
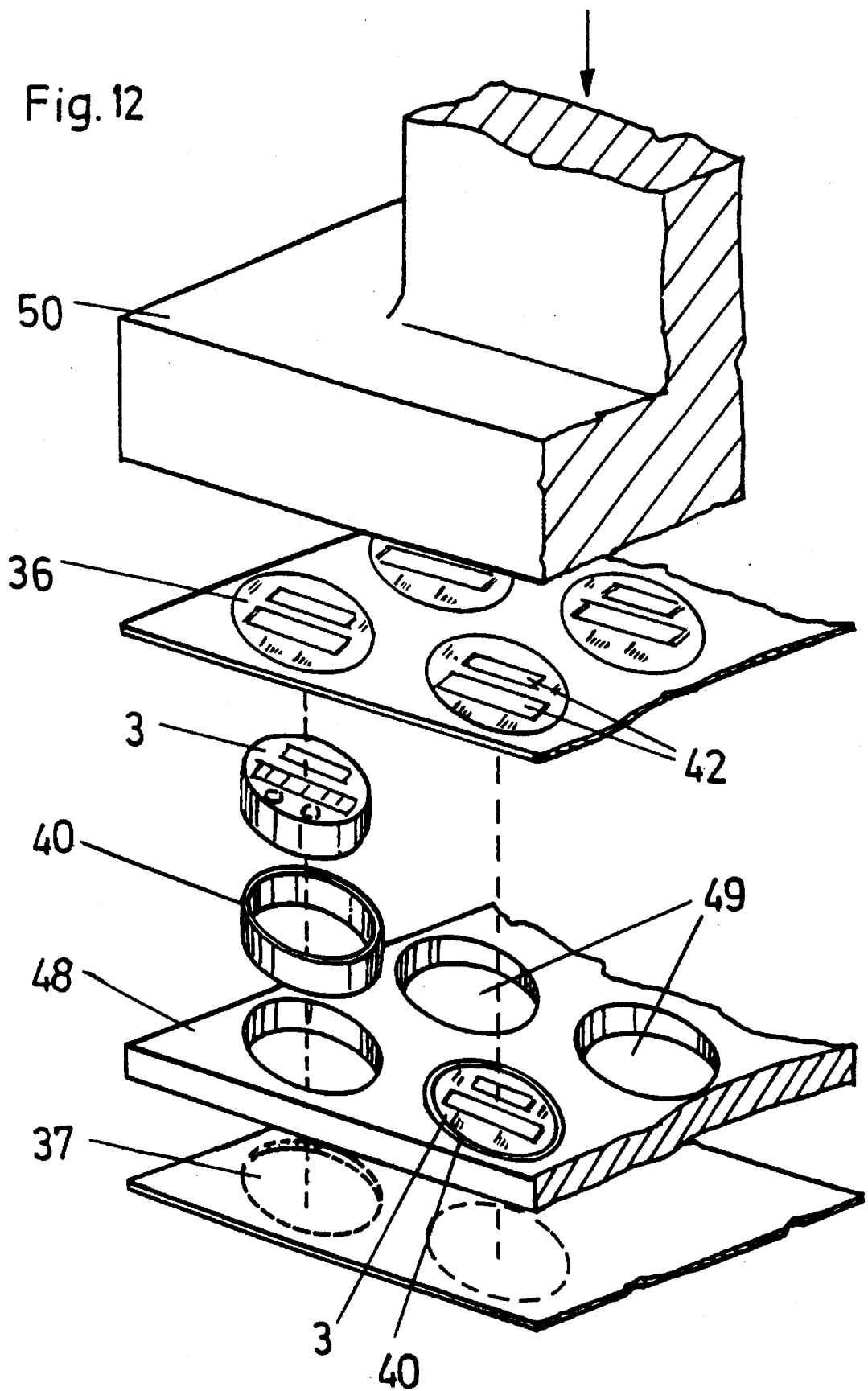
FIG. 12 is a schematic representation of the manufacturing of data carriers.

According to FIG. 3, the data carrier preferably has the form of a round disk 3 circumferentially enclosed by a metallic ring 40. The ring 40 is interrupted by a slot 41. The disk 3 receives in corresponding recesses a liquid crystal display 4, a solar cell 5 (or a number of solar cells), a memory 8 formed by an $E^2PROM$ and a microprocessor 7. The power required for operating the microprocessor 7 as well as the liquid crystal display 4 is produced by means of the solar cell 5 so that the data carrier is, except for the light, self-sufficient in respect of the energy required for the display. As shown in FIGS. 4 and 12, both sides of the disk 3 are covered with a protective film 36, 37, the protective film 36 comprising windows 42 for the liquid crystal display 4 and the solar cell 5, while covering the microprocessor 7 and the memory 8. The antenna 11 is helically printed onto the rear side of the disk 3, as can be schematically seen from FIG. 5. The disk 3 can like a coin (FIGS. 3 through 5) be inserted into the slot of a coding and reading station, if the latter-mentioned is provided with a sending-receiving unit. The antenna 11 is, as already mentioned, part of the data sending-receiving unit, which is not shown in detail, and communicates then with the sending-receiving unit in the region of the inserting slot. The metallic ring 40 stiffens the disk 3, the data and energy transmission being possible because of the slot 41.

The disk 3 can, as shown in FIGS. 6 through 11, be mounted in support means comprising a lower part 12 and an upper part 1. According to FIGS. 6 through 9, the upper part 1 is provided with a resilient locking bolt 35 which comprises a number of flaps, extends through a sleeve 23 standing up from the lower part and engages behind a widening 14. The two parts 1, 12 are held to be rotatable to each other to a limited extent. The sleeve 23 serves as a mounting axle for a spring-loaded spool 13 from which a cord 31 can be wound, the free end of the latter-mentioned carrying a fastening ring 16 or the like. The ring 16 engages in a recess 15 of the lower part 12 and is held there in fixed position. On the opposite side, the lower part 12 has an opening 18 in which there are arranged a resilient tongue 19 with a holding cam 24. In this region between the upper part 1 and the lower part 12, there is a slot 17 into which a card 20 or other plane objects having a hole can be inserted. The holding cam 24 of the resilient tongue 19 engages in the hole so that the card is fixed in the slot 17. The card 20 serves for personalizing the data carrier and comprises for this purpose for example a photograph of the owner and, if desired, shows optically visible the printed original data of the data carrier. If the control system also comprises reading stations with magnetic strip readers the card may also be provided with a magnetic strip. If desired, the card 20 can in this case also be fixed to the ring 16. To be able to insert the card 20 into the slot 17, both parts of the housing are turned in such a way that the resilient tongue 19 lies in the region of the recess 22 of the upper part 1 and is displaceable towards the upper part 1 by the card to be inserted. If the upper part 1 is then turned back into the illustrated position the resilient tongue 19 is fixed in the holding position in which it abuts the adapted stop 21 of the upper part 1.

In the upper part 1, there is formed a lowered area 2 in which the disk 3 shown in FIGS. 3 and 4 and comprising the liquid crystal display 4 and the solar cell 5, which is preferably provided, are arranged.

Figure 9:
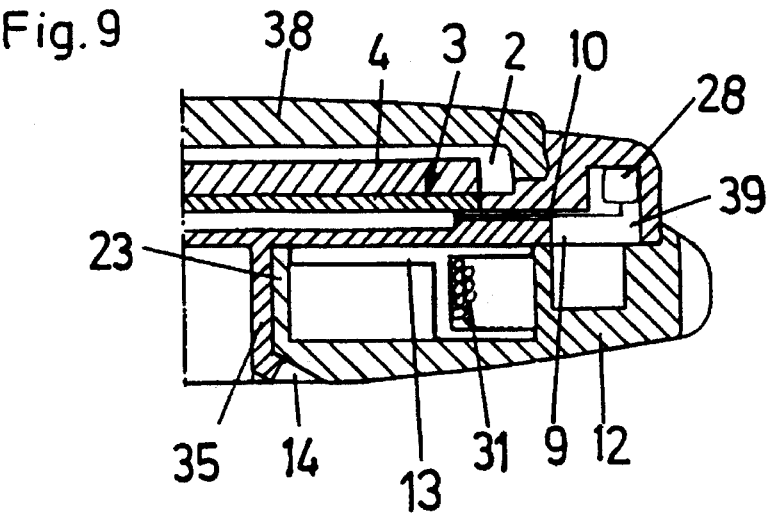

The lowered area 2 is closed by a transparent covering 38. Since, because of the shortness of the antenna 11 printed onto the disk 3, the range of the sending-receiving unit may be too limited, the coil 28 of the analogue element 26 is arranged in an annular groove 39 of the upper part 1 as an extension of the antenna. The connection 10 between the coil 28 and the antenna 11 of the disk 3 lies in a recess 9, as shown in FIG. 9, and abuts contacts 10 on the rear side of the disk 3, when the disk 3 is inserted. Said contacts lie below the protective layer 37 and are uncovered before the disk 3 is inserted.

Figure 11:
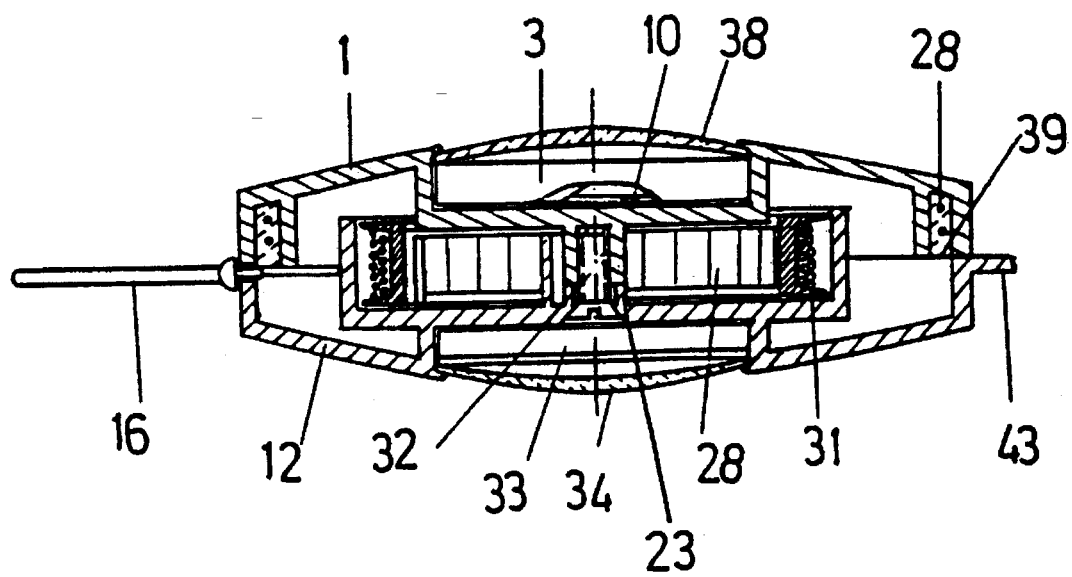
FIG. 11 shows a sectional view of FIG. 10.

As shown in FIG. 11, the two parts 1, 12 can also be connected by a screw 27. Both parts of the housing have a central lowered area, the disk 3 being fitted into one recess and a watch 33 into the other recess. Both recesses are closed by a transparent covering 38, 34. Instead of the watch 33 or in addition thereto, a photograph of the owner can be arranged under the covering 34.

Figure 10:
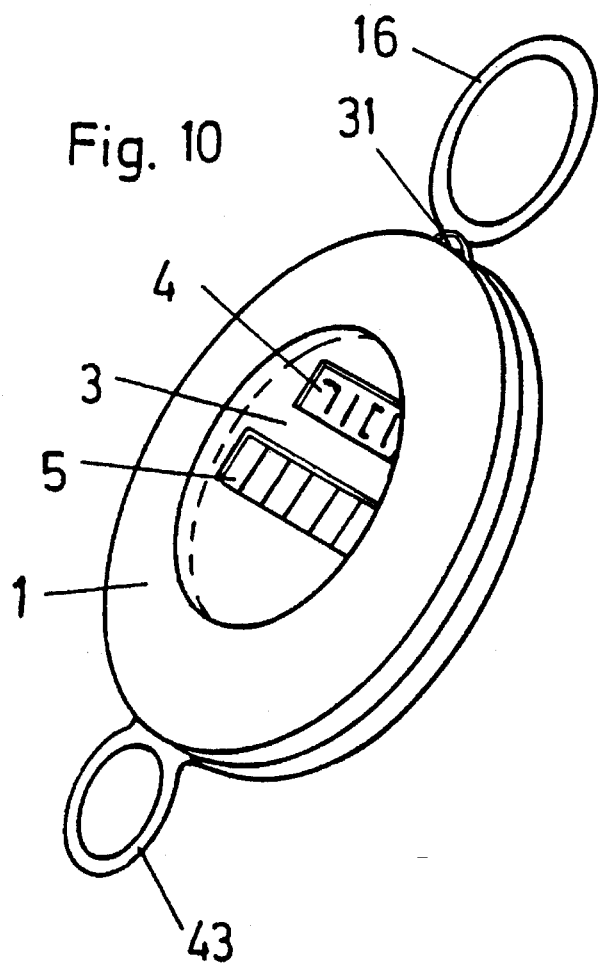
FIG. 10 shows an oblique view of the data carrier mounted in a second embodiment of the housing.

FIGS. 10 and 11 show a second fastening ring 43 which is arranged at the lower part 12 of the holding means and serves like the ring 16 for fixing the holding means to the clothing of the holder for example.

The data carrier can be manufactured in a simple manner by fitting rings 40 into a support plate 48 comprising holes, and by fitting disks 3 into said rings 40. A film forming the protective layer 37, the assembled support plate 48 and a film forming the protective layer 36 and including the windows 42 are placed into a mold and, under pressure by means of the schematic molding plug 50 and heat, melted to a coated data carrier. The ring 40 punches both protective layers 36, 37 out from the film.

We claim:

1. A data carrier for a non-contact data communication with a coding and/or reading station of an entry, identification or control system, the coding and/or reading station controlling a passage to an area or space by checking and/or changing data of authorization of passage on the data carrier, when the data carrier is presented to the coding and/or reading station, the data carrier comprising:

a carrier base structure;

a non-volatile, electrically erasable and programmable memory designed to store the data of authorization of passage;

a data sending-receiving unit for receiving data from the control system and transmitting data to the coding and/or reading station, the data sending-receiving unit comprising a sending-receiving logic writing data in the memory and reading out data from the memory;

a liquid crystal display for displaying data;

a means for making visible on the liquid crystal display the data stored in the memory; and a power supply system for providing power to the data carrier, the power supply system comprising a first and a second part electrically independent from each other, the first part being a power source arranged in the data carrier and connected with the liquid crystal display and the means for making visible the data on the liquid crystal display, and the second part being a non-contact power receiving element energized by a non-contact power transmitting unit of the coding and/or reading station, the second part being connected with the non-volatile memory and the data sending-receiving logic;

wherein the data carrier base structure has the form of a disk, the liquid crystal display and the solar cell unit being arranged on a first side of the disk, and a helically arranged antenna of the data sending-receiving unit being arranged on a second side of the disk; and wherein the disk is circumferentially enclosed by a metallic ring interrupted by a slot.

2. The data carrier according to claim 1, wherein the non-contact power receiving element comprises a power transfer coil.

3. The data carrier according to claim 1, wherein the first part of the power supply system comprises a solar cell.

4. The data carrier according to claim 1, wherein each side of the disk is covered with a protective film, the protective film including one window, each, in the region of the liquid crystal display and the solar cell.

5. A data carrier for a non-contact data communication with a coding and/or reading station of an entry, identification or control system, the coding and/or reading station controlling a passage to an area or space by checking and/or changing data of authorization of passage on the data carrier, when the data carrier is presented to the coding and/or reading station, the data carrier comprising:

a carrier base structure;

a non-volatile, electrically erasable and programmable memory designed to store the data of authorization of passage;

a data sending-receiving unit for receiving data from the control system and transmitting data to the coding and/or reading station, the data sending-receiving unit comprising a sending-receiving logic writing data in the memory and reading out data from the memory;

a liquid crystal display for displaying data;

a means for making visible on the liquid crystal display the data stored in the memory;

a power supply system for providing power to the data carrier, the power supply system comprising a first and a second part electrically independent from each other, the first part being a power source arranged in the data carrier and connected with the liquid crystal display and the means for making visible the data on the liquid crystal display, and the second part being a non-contact power receiving element energized by a non-contact power transmitting unit of the coding and/or reading station, the second part being connected with the non-volatile memory and the data sending-receiving logic; and a support means carrying the data carrier and comprising a spring spool and a cord extractable from the spring pool.

6. A data carrier for a non-contact data communication with a coding and/or reading station of an entry, identification or control system, the coding and/or reading station controlling a passage to an area or space by checking and/or changing data of authorization of passage on the data carrier, when the data carrier is presented to the coding and/or reading station, the data carrier comprising:

a carrier base structure;

a non-volatile, electrically erasable and programmable memory designed to store the data of authorization of passage;

a data sending-receiving unit for receiving data from the control system and transmitting data to the coding and/or reading station, the data sending-receiving unit comprising a sending-receiving logic writing data in the memory and reading out data from the memory;

a liquid crystal display for displaying data;

a means for making visible on the liquid crystal display the data stored in the memory;

a power supply system for providing power to the data carrier, the power supply system comprising a first and a second part electrically independent from each other, the first part being a power source arranged in the data carrier and connected with the liquid crystal display and the means for making visible the data on the liquid crystal display, and the second part being a non-contact power receiving element energized by a non-contact power transmitting unit of the coding and/or reading station, the second part being connected with the non-volatile memory and the data sending-receiving logic; and a support means carrying the data carrier and comprising an antenna extension connected to a bare contact of the antenna, the antenna extension forming the power transfer coil of the non-contact power receiving element;

wherein the data carrier base structure has the form of a disk, the liquid crystal display and the solar cell unit being arranged on a first side of the disk, and a helically arranged antenna of the data sending-receiving unit being arranged on a second side of the disk.

* * * * *